United States Patent [19]

Funke

[11] 3,747,009

[45] July 17, 1973

[54] TELEPHONE SIGNALING UNIT FILTER CIRCUIT

[75] Inventor: Klaus Ernst Funke, Novato, Calif.

[73] Assignee: Digital Telephone Systems, Inc., San Rafael, Calif.

[22] Filed: Jan. 20, 1972

[21] Appl. No.: 219,585

Related U.S. Application Data

[62] Division of Ser. No. 49,399, June 24, 1970, Pat. No. 3,637,443.

[52] U.S. Cl. ........................ 330/146, 333/6, 333/74

[51] Int. Cl. ............................................ H03f 3/00

[58] Field of Search ........................ 330/146, 74, 77, 330/6; 307/233, 295

[56] References Cited

UNITED STATES PATENTS

| | | | |
|---|---|---|---|
| 3,596,198 | 7/1971 | Niki et al. | 330/146 X |
| 3,588,728 | 6/1971 | Elazer | 330/146 X |

*Primary Examiner*—Nathan Kaufman

*Attorney*—Karl A. Limbach, Thomas A. Gallagher et al.

[57] ABSTRACT

An in-band telephone signaling unit of the type useful in carrier trunk systems is disclosed having receive and transmit pulse correction circuits and a band stop/-bandpass filter for using an idle channel for supervisory purposes. The transmit pulse correction circuit provides constant length pulses in response to varying length pulses; the receive pulse correction circuit looks for pulses longer than a predetermined length and generates pulses having a constant duty cycle. The bandstop/bandpass filter employs a resonant arm in an active resistance bridge configuration.

2 Claims, 6 Drawing Figures

TELEPHONE SIGNALING UNIT FILTER CIRCUIT

This is a division of application Ser. No. 49,399, filed June 24, 1970 now U.S. Pat. No. 3,637,443.

BACKGROUND OF THE INVENTION

This invention relates generally to telephone systems and more particularly to a telephone signaling unit.

In many modern telephone systems the trunk interconnection between central offices uses carrier transmission. Consequently, the signaling or control information necessry to establish telephone connections is transmitted as an in-band single frequency tone. In-band means a frequency lying within the normal voice-frequency band. Ordinarily, a continuous low amplitude tone is transmitted in a channel to indicate that it is idle; dialing pulses are transmitted as interrupted tones at a higher amplitude level.

Dialing pulses are generated over a DC circuit known as an "M" lead, in telephone parlance. The pulses are negative voltages, ordinarily −21 volts to −56 volts. The dialing pattern is reproduced at the remote end of the channel on an "L" lead that opens and closes a relay. Because of various factors including variations in dial pulse length and pulse rate generated by the telephone itself and noise on the telephone lines it is often necessary to correct the dialing pulses by varying their length in order that the switching equipment receiving the pulses operate properly. This is particularly a problem when two systems are interfacing with each other over a carrier system; dial pulse timing that is acceptable in one system may not be acceptable in the other. Because a signaling unit may be working end-to-end with other signaling units which do not provide dial pulse correction it is desirable to provide correction circuits in both the transmit and receive signaling paths.

In the case of an idle channel, it is desirable to be able to use the voice path for supervision while the low amplitude constant signaling tone is present.

In accordance with the invention, a signaling unit is provided with a receive pulse correction circuit, a transmit pulse connection circuit, and a bandstop/-bandpass filter for permitting supervisory use of an idle channel despite the presence of the constant tone.

According to one embodiment of the invention a transmit pulse correction circuit is provided that compensates for variations in the length of input dial pulses. The circuit provides for a constant output pulse length over a wide variation in input pulse rates and pulse lengths by an arrangement of two series connected NOR gates. A one-shot is associated with each gate; the second one-shot assures a constant output pulse length, the first one-shot tends to provide a constant pulse off time in order that a generally constant duty cycle results.

The invention further provides a bandstop/bandpass filter. If signaling tone is recognized on the incoming line, the receive voice path is routed through the filter to provide a tone output and a voice minus tone output. The filter is essentially an active resistance bridge with a sharp resonance at the tone frequency in one of the arms. By this arrangement, the tone output may be taken at one point in the bridge and the voice less tone at another.

In addition, the invention contemplates in the signaling unit, a receive pulse correction circuit. Since the received signaling tones are more likely to be incorrect because of noise and other variations, the correction circuit is more complex than the transmit correction circuit. The receive pulse correction circuit will act only on pulses exceeding a minimum time duration, in order to eliminate false pulses caused by noise. The circuit operates to provide a fixed output duty cycle for any particular input pulse rate no matter how the input duty cycle may vary. Adjustments for fast pulse rates are provided. The output pulses thus are adapted to optimally operate switching units that desirably require constant dial pulse duty cycles.

DESCRIPTION OF THE PREFERRED EMBODIMENTS

Figure 1:
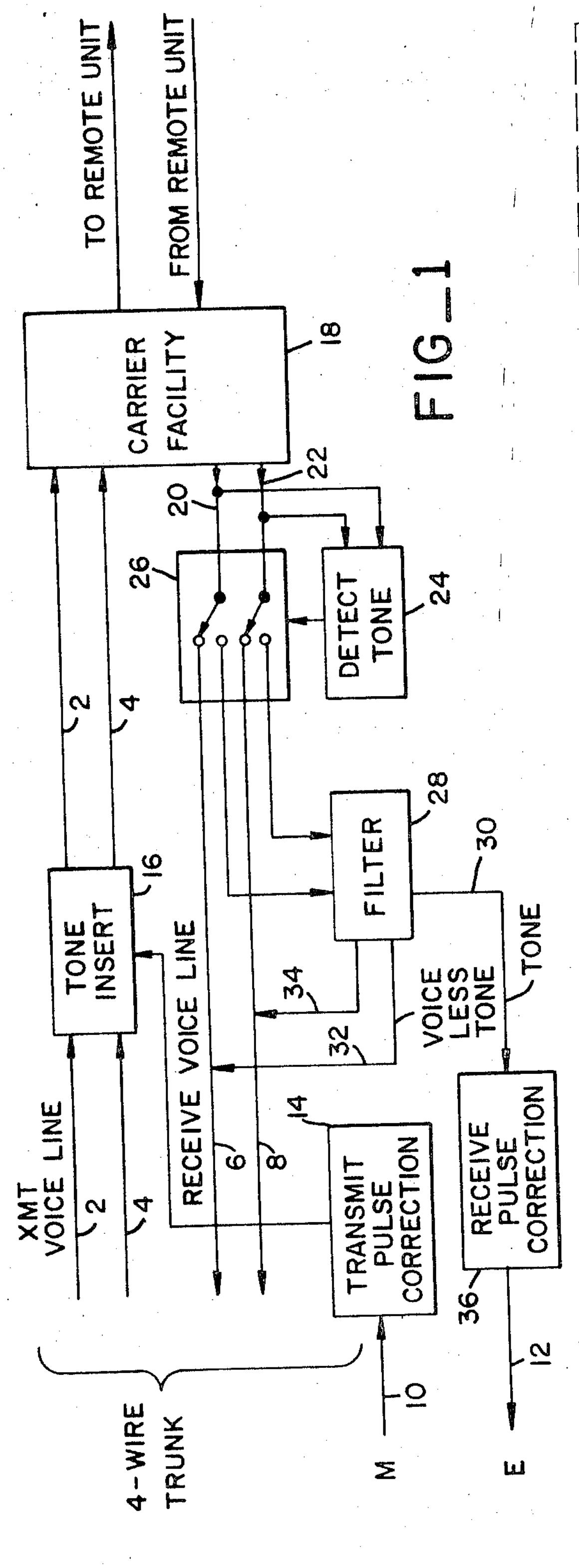
FIG. 1 is a block diagram of an embodiment of the signaling unit according to the present invention.

Referring now to FIG. 1 of the drawings, a block diagram of the signaling unit according to one embodiment of the invention is shown. The unit is designed to connect to a standard four wire trunk via lines 2, 4, 6 and 8; two wires for the transmitted voice (2 and 4) and two for the received voice (6 and 8). By using a conventional hybrid the four wires may be connected to a two-wire trunk. In addition, standard "E" and "M" DC signaling lines 10 and 12, respectively, are provided. Dialing pulses, in the form of negative voltages, applied to the M lead will cause contact closure on the E lead at a remote signaling unit similar to that shown in FIG. 1. Since the units are essentially identical, only one is shown. The E lead contact closures reproduce the dialing pattern applied to the remote M lead.

M lead negative dialing pulses on line 10 are applied to a transmit pulse correction circuit 14. Circuit 14 looks for positive or negative going transitions greater than a predetermined minimum time, 14 milliseconds for example. Once a transition has been recognized, a timing circuit controls a tone oscillator having a single tone frequency in the voice band, 2600 Hz, for example, to insure that the tone-on/tone-off ratio will be acceptable over a wide range of dialing speeds, for example, 8 to 14 pulses per second. The tone on/tone off ratio is important to insure that the dialing pulses will properly actuate remote switching equipment.

Correction pulse tones from circuit 14 are applied to a tone insert unit 16 that applies the tones to the transmit voice line 2 and 4 for connection to a carrier facility 18. Ordinarily voice inputs on lines 2 and 4 are inhibited during dialing by circuitry not shown or forming part of the invention. Also, when the line is not being used for voice communication, a tone, having a constant level, lower than the dialing pulse tone, is applied to the carrier facility 16. The carrier facility may be any type of carrier system, employing any type of modulation known in the art. For example, frequency division multiplex frequency modulation (FDM-FM) may be used. Also, cables, microwaves, satellites, lasers, or any other type of link may be used to connect separate units. The details of the carrier system forms no part of the present invention.

A pair of receive lines 20 and 22 from the carrier facility 18 are connected to a tone detector unit 24 and a double pole double throw switch 26 that is controlled by unit 24. Tone detector 24 looks for the signaling tones. Because the tones are in the voice band, the detector must be able to distinguish between signal tones (of 2,600 Hz for example) and 2,600 Hz components in speech or noise in the frequency band. A suitable circuit compares the spectral energy present at the signaling frequency with the energy in the rest of the voice band. The 2,600 Hz components will be recognized as signaling tone only if their energy level is significantly higher than the energy level in the rest of the voice band, and then only if this difference is maintained for a sufficient period of time. The details of such a circuit are within the ordinary skill in this art, and, forming no specific part of the invention, will not be disclosed here.

If no tone is detected, switch 26 is positioned to connect lines 20 and 22 directly to the receive voice line 6 and 8. This is the normal talking condition of the unit. If, however, a tone is detected, then lines 20 and 22 are connected to a filter unit 28. Filter 28 sharply filters out the signal tone for application to line 30. On lines 32 and 34 the voice band with the signal frequency rejected is provided from filter 28. This arrangement permits the receive voice path to be used for supervision while the low level signal tone is present during the idle channel condition. When high amplitude level signal tones, representing dial pulses are received, supervisory "talk-over" is not provided.

A receive pulse correction circuit 36 receives the signal tone on line 30 and recognize transitions from off to on of greater than a preset minimum time. Thus noise is not recognized as a tone burst or space between tone bursts. Once transitions are recognized, the circuit insures that the E lead contact, line 12, will be closed for a substantially constant proportion of the time during dialing despite variations in dialing rates and variations in the duty cycle of the dialing pulses. The receive correction circuit is necessary even if the remote unit is equipped with a transmit pulse correction circuit because of variable signal tone burst length from the transmit equipment.

Figure 2:
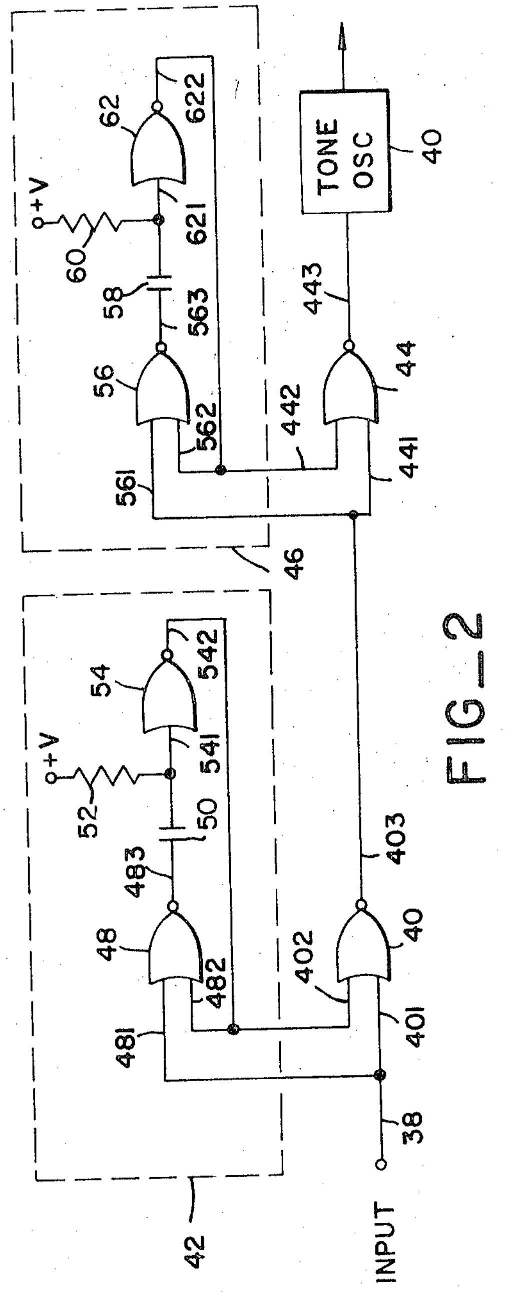
FIG. 2 is a schematic diagram of am embodiment of the transmit pulse correction circuit according to the present invention.

In FIG. 2 the transmit pulse correction circuit is shown in greater detail as including six RTL (resistor transistor logic) NOR gates. A NOR gate provides a logic "1" (positive) output only when both inputs are a logic "0" (ground). For all other combinations of inputs the output is "0." Dialing pulses are applied on input line 38; a ground or "0" represents a pulse and positive or "1" represents a space between pulses. In general, a "0" on input line 38 turns on tone oscillator 40 and a "1" turns the oscillator off.

The pulses on line 38 are applied to input 401 of gate 40 and to a first one-shot circuit 42. The gate output at 403 is applied to input 441 of gate 44 and to a second one shot circuit 46. Output 443 of gate 44 controls the tone oscillator 40; a "0" at 443 turns the oscillator on, a "1" turns it off.

One shots 42 and 46 function identically except for their time constants. In the steady state condition inputs 481 and 482 of gate 48 are "0." Input 481 is connected to line 38 and is the input of one-shot 42. When a transition from "0" to "1" occurs at input 481, the output 483 of gate 48 goes from "1" to "0" thus instantaneously clamping one side of capacitor 50, which is connected to output 483, to ground. The opposite side of capacitor 50 which is connected to a positive voltage source +v through resistor 52 and to input 541 of gate 54, must also drop to ground. The output 542 of gate 54 will thus be "1;" this output is fed back to input 482 of gate 48 and provides the one-shot output to input 402 of gate 40. As capacitor 50 charges through resistor 52 according to the RC time constant of those components, the voltage at input 541 rises and eventually becomes sufficiently positive to flip gate 54 to provide a "0" at output 542. Thus a "0" to "1" transition at input 481 initiates a time period during which the one shot provides a "1" output. During that time period the input 481 may change to any value because the "1" is fed back to input 482 of gate 48 thus forcing output 483 to remain "0."

In the same manner, the second one shot has an input 561 to a gate 56. The gate output 563 is connected to capactor 58 that is in turn connected first to a positive voltage source +*v* through a resistor 60 and to an input 621 of a gate 62. Gate 62 has its output 622 fed back to input 562 of gate 56 and to input 442 of gate 44 to provide the one shot output.

In order to better appreciate the operation of the circuit, the following table is presented, showing the four possible operations a time before an input transition ($t_n$) and a time after an input transition ($t_{n+1}$):

| Input Condition at 401 | | First One Shot | | Second One Shot | | Tone |
|---|---|---|---|---|---|---|
| $t_n$ | $t_{n+1}$ | 402 | 403/441 | 442 | 443 | Osc. |
| 0 | 0 | 0 | 1 | 0 | 0 | tone |
| 0 | 1 | 1 | 0 | 0 | 1 | no tone |
| 1 | 1 | 0 | 0 | 0 | 1 | no tone |
| 1 | 0 | 0 | 1 | 1 | 0 | tone |

Conditions 1 and 3 are steady state conditions; 2 and 4 are states after a transition.

In operation, the following events can occur. If the duration of a "0" input is longer than the time of the second one shot, the tone-on time is the same length as input "0." This is condition 1. If the following "1" is in duration longer than the time of the first one shot, the tone-off time will be the same length as the "1" input. This is condition 3. In both cases, the one shots are timed out and the input is directly controlling the output.

In condition 2, a minimum tone-off time is provided equal to the time of the first one-shot 42 in some cases, as will be apparent hereinafter. Thus, when a "0" to "1" transition occurs the first one-shot 42 starts timing to keep 403 a "0" even if the input "1" switches state back to "0." As long as 403 is "0," the second one shot 46 is prevented from turning on and the tone oscillator is kept off.

In condition 4, a minimum tone-on time is provided equal to the time of the second one-shot 46. The new "0" will not turn on the first one-shot 42, thus 401 and 402 are "0" and 403 is "1" turning on the second one shot 46 causing the tone oscillator to go on. Even if the input "0" switches to "1" the second one-shot remains on, keeping the oscillator 40 on.

It will be apparent that the second one shot 46 can override the first-one-shot 42. Thus even if a "1" closely follows a "0," the fact that the first one shot begins timing will have no effect on the second one shot. Thus, it is possible that the first-one-shot time will not affect the output if the second one shot is still on. When the second one-shot finishes timing, the first one shot, if it is still timing will provide a shortened no tone output. The practical result is that the tone on spaces are always at least a minimum length, equal to the time of the second one-shot 46, but the tone off times may be shortened. This is a desirable result, because the tone on periods must be of a fixed minimum duration to assure proper switching at remote units. If a sacrifice must be made, it is more desirable to shorten the tone off period when necessary.

Figures 3, 4:
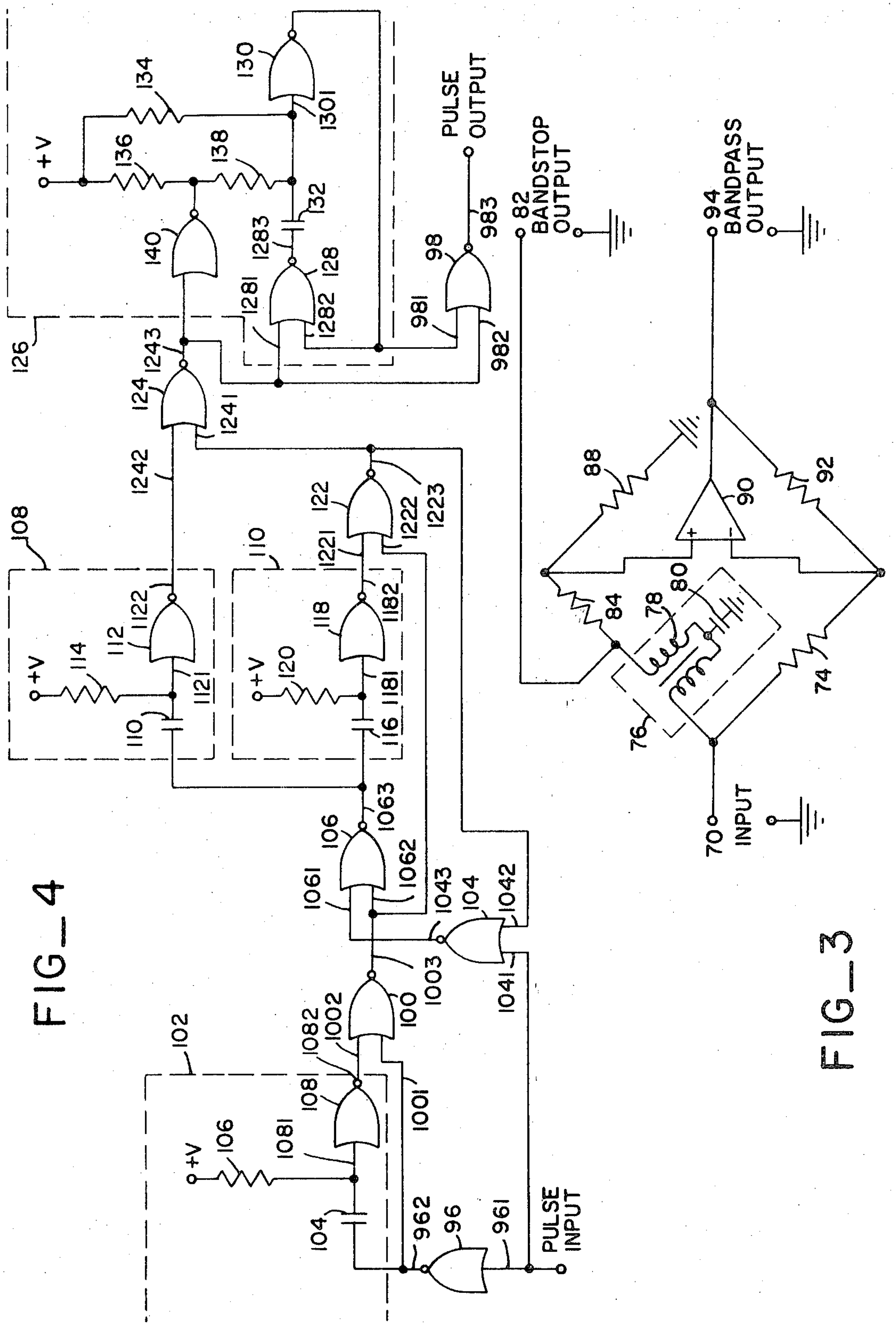
FIG. 3 is a schematic diagram of am embodiment of the bandstop/bandpass filter according to the present invention.
FIG. 4 is a schematic diagram of an embodiment of the receive pulse correction circuit according to the presinvention.

In FIG. 3 an embodiment of the bandpass and bandstop filter 28 of FIG. 1 is shown in greater detaill. To facilitate understanding of the filter, it is shown in a bridge configuration. The combined voice and tone signals are applied at the left-hand corner of the bridge at input terminal 70. Terminal 70 is connected to the junction of a resistor 74 and a passive LC filter 76. Filter 76 is a transformer type LC series resonant filter, resonated at the signal tone frequency, consisting of a transformer 78 having first and second windings connected together at one end and to a capacitor 80. The other end of the capacitor is grounded. The ends of the windings not connected together are connected to input 70 and to the bandstop output terminal 82, respectively. A resistor 84 is connected between the bandstop output 82 and the top of the bridge. A resistor 88 is connected between the top of the bridge and ground. An operational amplifier has its positive input connected to the top of the bridge; its negative input is connected through a resistor 92 to the amplifier 90 output and to the bandpass output terminal 94. A resistor 74 is connected between the bottom of the bridge (and the amplifier 90 negative input) and the input terminal 70.

In operation, when the bridge is balanced (R84/R88) = (R74/R92) and the output is at a virtual ground. The input voltage is divided by R84 and R88 and applied to the positive input of amplifier 90. The amplifier output will change its state in order to make the negative input as high as the positive input. If a high Q rejection filter, such as filter 76 is placed in the arm of the bridge containing R84, the bridge will be unblaanced for the rejected frequency and the amplifier becomes a unity gain amplifier if R74 equals R92.

In FIG. 4 an embodiment of the receive pulse correction circuit 36 of FIG. 1 is shown in greater detail. The circuit has 13 NOR gates that are connected to provide four timing functions. A NOR gate provides a logic "1" output only when both inputs are "0."

In the steady state condition, the circuit input at 961 of gate 96 is "0" and the circuit output at 983 of gate 98 is "1." A "0" input indicates no received pulse. Upon receipt of an incoming pulse, 961 goes to "1," causing 962 to go to "0." Thus input 1001 of gate 100 and the input of recognition timer 102 to to "0." Recognition timer 102, "looks" to see if the pulse exceeds a predetermined minimum time; it consists of an input capacitor 104 that is connected to a positive voltage source +v through a resistor 106. The resistor 106, capacitor 104 junction is connected to input 1081 of gate 108. When one side of the capacitor 104 instantaneously goes to "0," so must the other side causing 1081 to be "0" and output 1082 of gate 108 to be "1". As capacitor 104 charges through resistor 106, input 1081 rises in voltage until gate 108 flips to provide a "0" output. Thus after the predetermined recognition time, 1082 becomes "0." If and only if there is still a pulse input at 961, then inputs 1001 and 1002 of gate 100 will both be "0" thus making output 1003 a "1." The pulse at 961 is also applied at input 1041 of gate 104, making output 1043 be "0." Thus gate 106 receives at input 1061 a "0" from gate 104 and at input 1062 a "1" from gate 100. Gate 106 is therefore "0" at its output 1063.

A "0" at output 1063 of gate 106 initiates two timing circuits: a trigger delay 108 and a hold timer 110. Both function in a way similar to recognition timer 102. Hold timer 110 becomes a one-shot when the input signal changes state and closes the feedback path via gate 122 and gate 104. Trigger delay 108 includes an input capacitor 110 connected to an inverter gate 112, and a charging resistor 114 connected between the junction of capacitor 110 and the input 1121 of gate 112 and a positive voltage source +*v*. Hold timer 110 includes an input capacitor 116 connected to an inverter gate 118 and a charging resistor 120 connected to the junction of capacitor 116 and the input 1181 of gate 118.

If the positive input pulse at 961 changes state after starting hold timer 110, a feedback path including a gate 122 and gate 104 keeps the hold timer operating. Output 1182 of gate 118 is connected to input 1221 of gate 122; input 1062 of gate 106 and input 1222 of gate 122 are tied together. The output 1223 of gate 122 is applied to input 1042 of gate 104 and to input 1241 of a gate 124. Thus 1221 is "1," 1223 and 1042 are "0" and 1041 is "0" making 1043 "1."

If, however, a new pulse comes along, 1041 becomes "1" and 1043 goes to "0" causing 1061 to go to "0". The recognition timer will be on, hence 1062 is "0" and thus 1063 is "1" and the timers are turned off (0) because the capacitors and inverter gate inputs are forced to "1." If the trigger delay has not timed out by the time the new pulse arrives, it will be seen that there is no output pulse.

If a new pulse does not arrive before the hold timer times out, the feedback path is opened when the hold timer times out.

After timing out of the trigger delay, the input 1242 of gate 124 goes to "0." Input 1241 will also be "0" and hence its output 1342 is "1." The "1" initiates a variable one-shot 126 that includes an input gate 128 having two inputs 1281 which are connected to 1243, and 1283 that is connected to the output 1302 of gate 130. The output of gate 128 is connected to a capacitor 132 that is further connected to the input 1301 of gate 130. The junction of capacitor 132 and input 1301 has a resistor 134 connected between there and positive voltage source +*v* and also a series connection of resistors 136 and 138 connected between the junction and +*v*. The junction of resistors 136 and 138 is connected to the output 1402 of a gate 140. Input 1401 of gate 140 is connected to the input 1281 of gate 128. Output gate 98 has its input 981 connected to 1302 and has its input 982 connected to 1281. Hence, at the end of the trigger delay period, the hold timer is allowed to begin its control of the variable one-shot 126. If the trigger delay is interrupted by the early arrival of an input pulse, the one shot will not be initiated.

As long as the hold timer 110 runs or a positive pulse is present at 961 one shot 126 will determine the output pulse duration (1221 is "1" when the hold timer is on; 1222 is "1" when there is an input pulse — either condition causes 1223 to be "0" thus 1241 and 1242 are both "0" and 1243 is "1" starting one shot 126). So long as one shot 126 runs, 981 will be "1" causing the output 983 to be "0" and generating a pulse.

Initially one shot 126 will have only resistor 134 active in the charging circuit because 1402 is at "0" and the resistor 136, resistor 138 junction is grounded. When the next positive pulse arrives, the hold timer is stopped, if it is still running, and consequently 1402 goes to "1" thus placing series resistor 136, 138 in parallel to resistor 134 decreasing the resistance and time constant, hence shortening the output pulse length.

Figure 5:
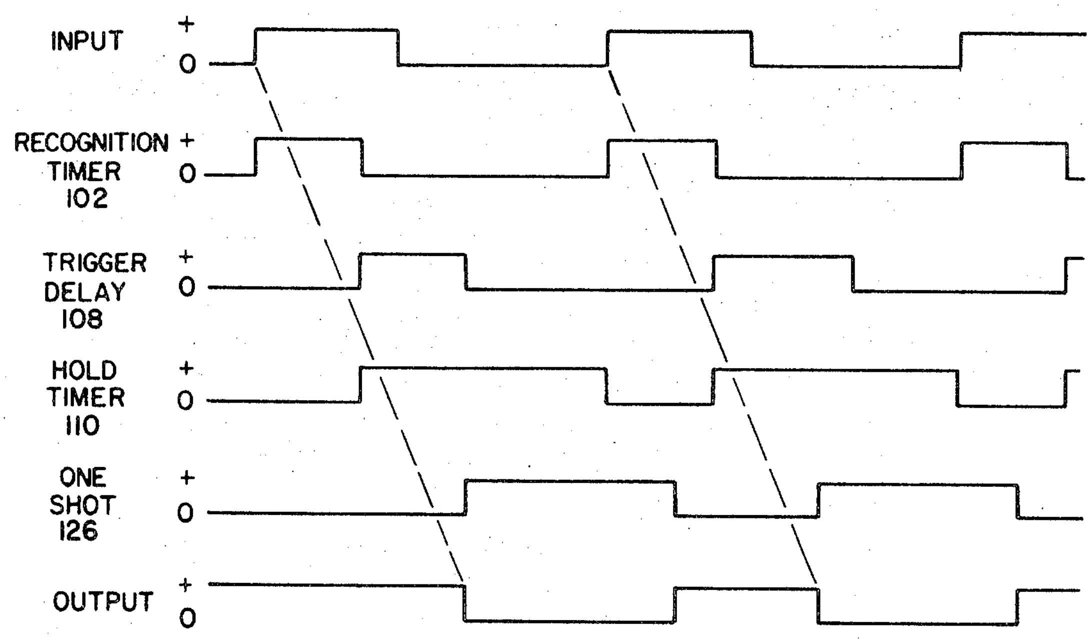
FIG. 5 is a waveform diagram useful in understanding the circuit of FIG. 4.
Figure 6:
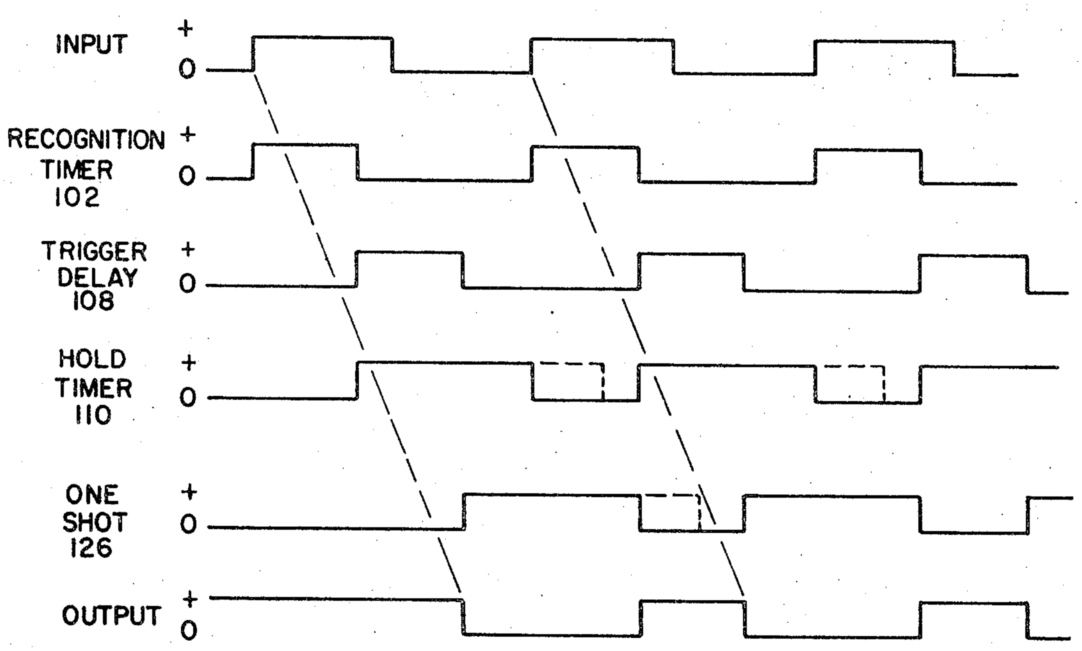
FIG. 6 is a further waveform diagram useful in understanding the circuit of FIG. 4.

The operation of the receive pulse correction circuit may be better understood by reference to the waveforms in FIGS. 5 and 6. It should be borne in mind that the circuit is acting to provide a fixed output duty cycle for any input pulse rate despite variations in the input duty cycle.

In FIG. 5, the input pulses actuate the recognition timer. Since the input is still present at the end of the recognition time, the trigger delay 108 and hold timer 110 are actuated. At the conclusion of the trigger delay one shot 126 begins running. Thus recognition timer 102 and trigger delay 108 provide a phase shifting effect. One shot 126 has a time constant due to resistor 134 during the time hold timer is running, when the hold timer ceases to run resistor 136 and 138 are switched in parallel to resistor 134 and the time constant increases. For the example of FIG. 5 the hold timer runs its normal full time and the output, which is the negative of the one shot output, is of normal pulse length. For input pulse rates no shorter than in the example of FIG. 5 the output pulse length will be of this fixed length, even though the input pulses may vary in length (duty cycle).

Referring to FIG. 6, the case of a faster input pulse rate is shown. In order to accommodate this condition and yet maintain a usable output duty cycle, the output pulses are shortened. This action occurs in the hold timer; the normal hold time period is interrupted by a new input pulse, thereby switching the one shot 126 time constant sooner than normal to shorten the output pulse. Thus, the pulse correction circuit has essentially two functions: the input pulse edge is shifted in phase so that the input pulse rate may be taken account of. Depending on the input pulse rate, the output pulse is controlled by controlling the variable one-shot.

It is understood that the above-described embodiments are illustrative of the principles of the invention. Numerous other arrangements may be derived by those skilled in the art without departing from the spirit and scope of the invention.

I claim:

1. In a telephone signaling unit of the type used with in-band carrier systems, a filter circuit for simultaneously providing a bandpass output representing the in-band signal tone and a bandstop output representing the voice frequency band minus the signal tone frequency in response to an input voice frequency signal containing an in-band signal tone comprising:

a four-arm bridge circuit having a first, second, third, and fourth corner, means for receiving said input signal at said first corner, passive circuit means for resonating at said in-band signal tone frequency having first and second terminals, means for connecting said first terminal to said first corner, means for connecting said second terminal to said second corner, said last named means including first resistance means, terminal means connected to the junction between resonator and First resistor means for providing said bandstop output, operational amplifier means having a positive input, a negative input, and an output, means for connecting said amplifier positive input to said second corner, second resistance means connected between said positive input and ground, third resistance means connected bewteen said first corner and said fourth corner, means for connecting said amplifier negative input to said fourth corner, fourth resistance means connected between said fourth corner and said third corner, means for connecting said amplifier output to said third corner, and terminal means connected to said third corner for providing said bandpass output.

2. The circuit of claim 1 wherein said passive circuit means comprises:

a transformer having two windings, a first end of each winding connected to said first and second terminals, respectively, the remaining ends of said windings connected together and to one side of a capacitor, the other side of said capacitor connected to ground.

* * * * *